J. C. CALDWELL.
WATER CRAFT.
APPLICATION FILED JUNE 27, 1914.
1,137,695.
Patented Apr. 27, 1915.
5 SHEETS—SHEET 1.
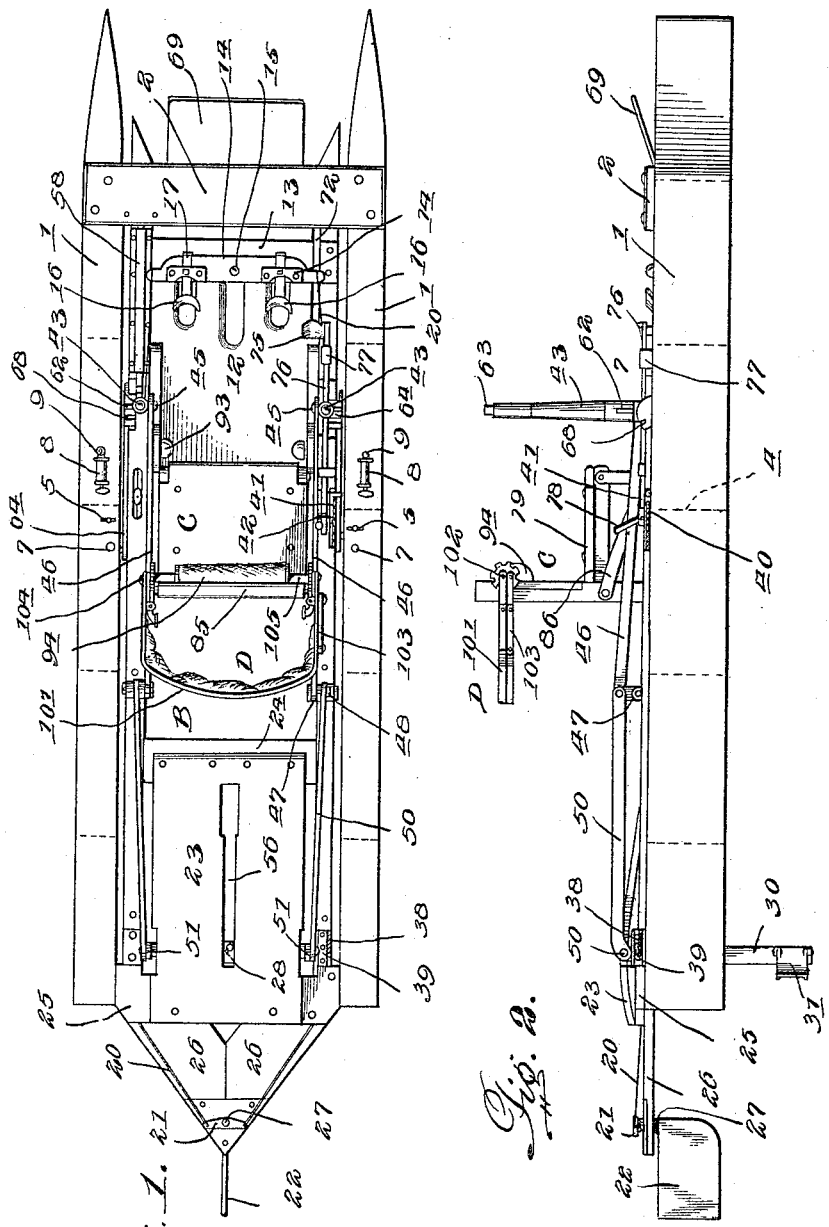
Witnesses
Frederick L. Joy.
R. M. Smith.
Inventor
J. C. Caldwell.
By Victor J. Evans.
Attorney

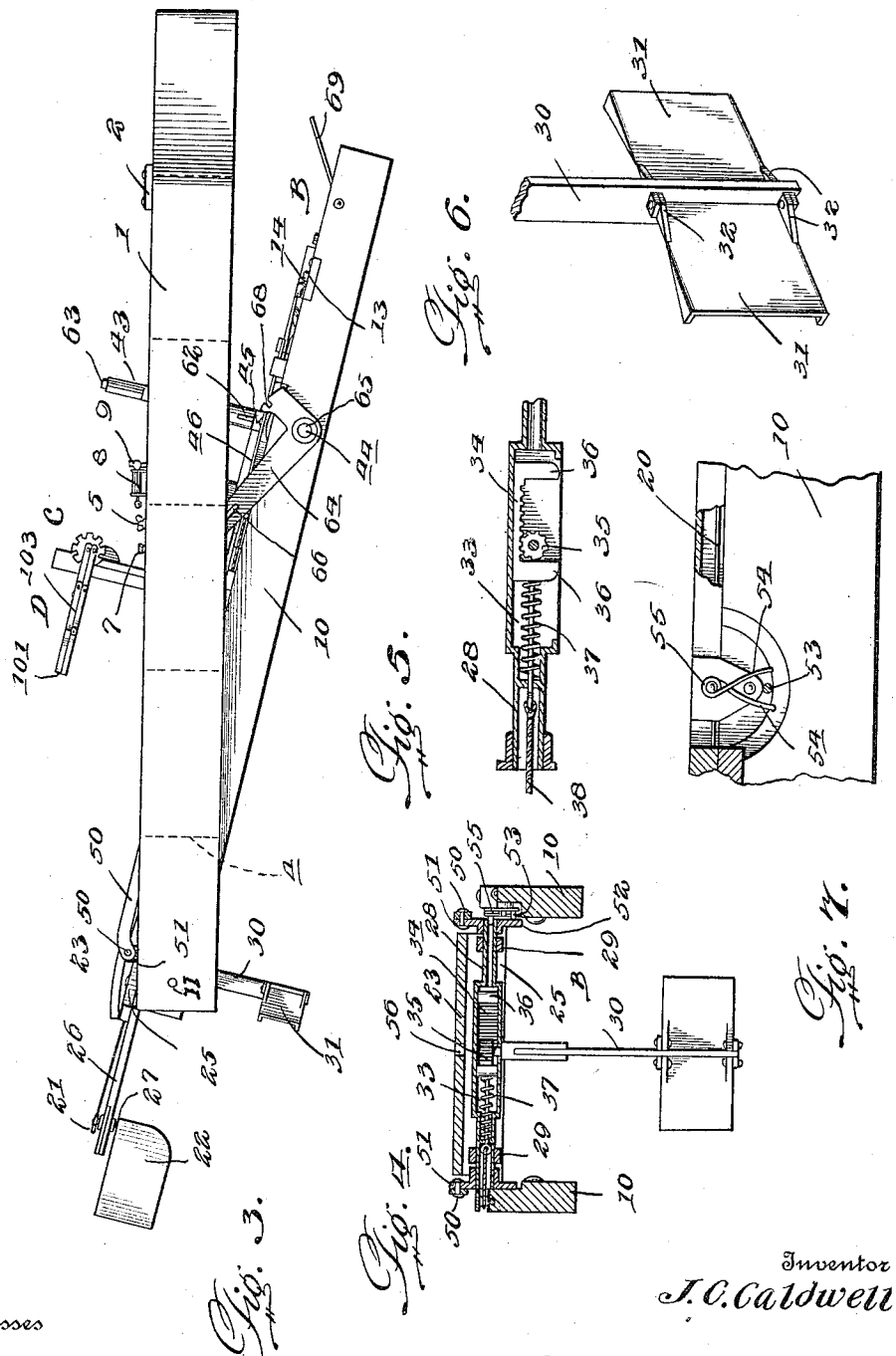

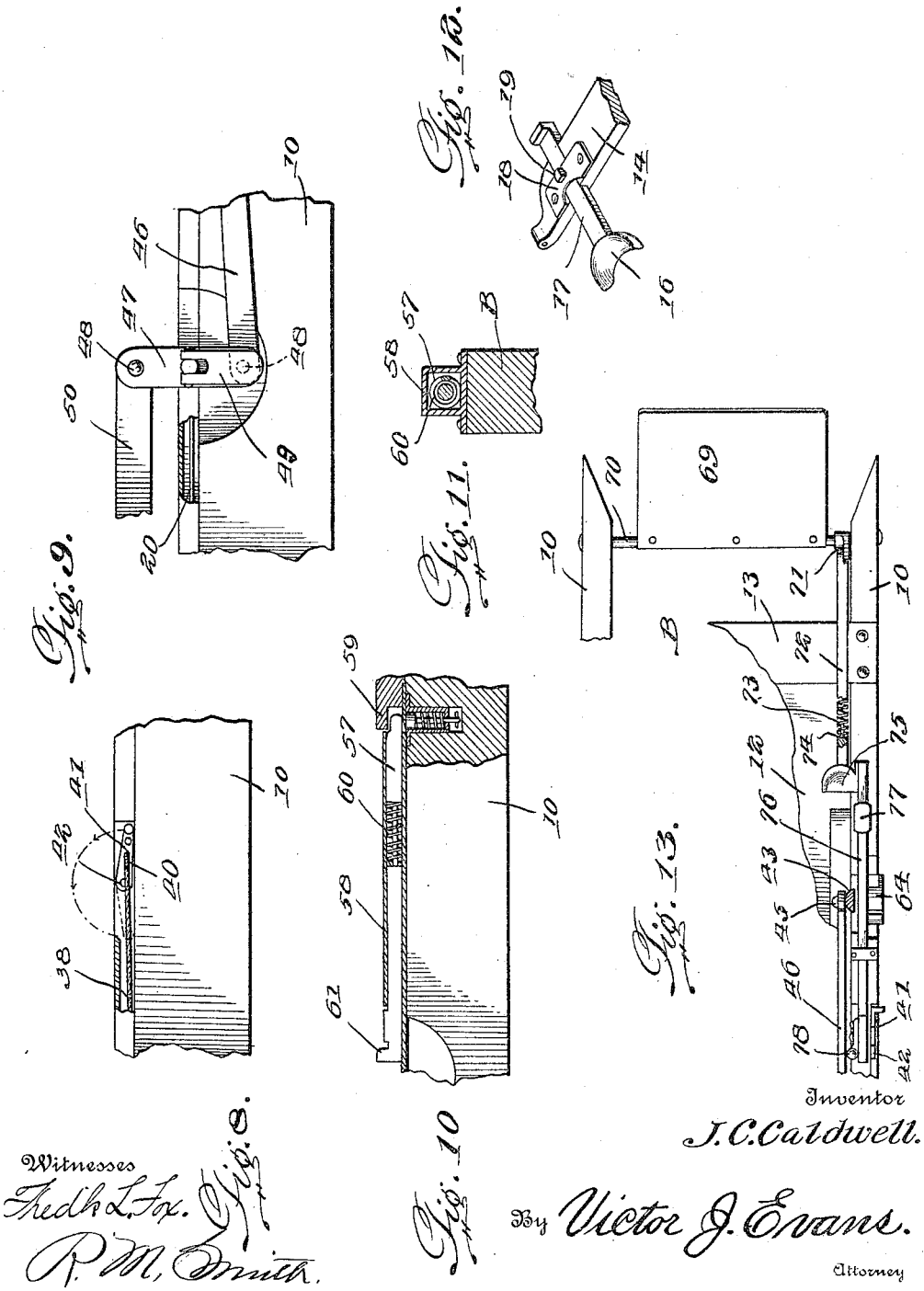

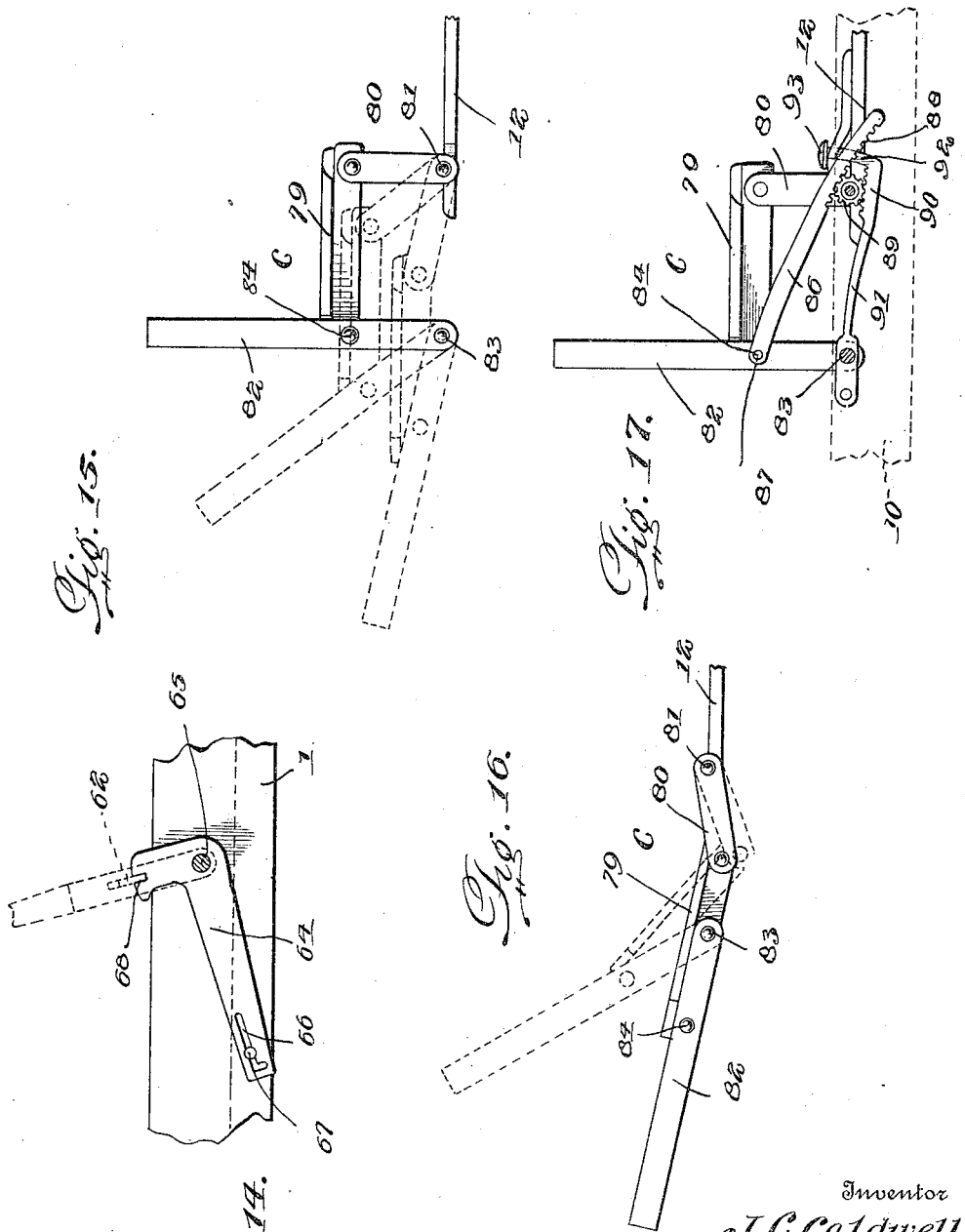

J. C. CALDWELL.
WATER CRAFT.
APPLICATION FILED JUNE 27, 1914.
1,137,695.
Patented Apr. 27, 1915.
5 SHEETS—SHEET 5.
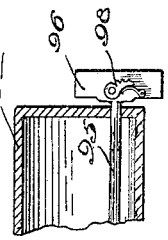
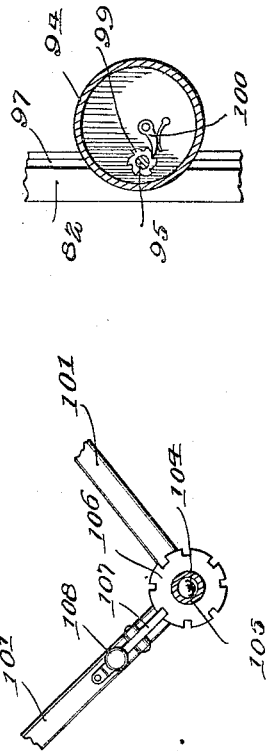
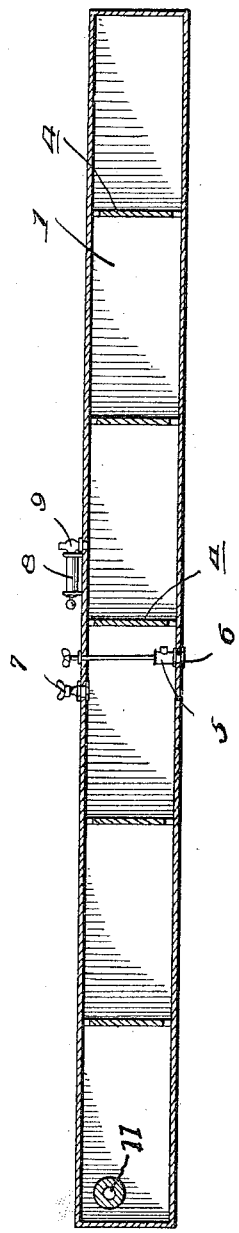
Witnesses
Frederick L. Fox.
P. M. Smith.
Inventor
J. C. Caldwell.
By Victor J. Evans.
Attorney

UNITED STATES PATENT OFFICE.

JOHN C. CALDWELL, OF BEAUMONT, TEXAS.

WATER-CRAFT.

1,137,695.  Specification of Letters Patent.  Patented Apr. 27, 1915.

Application filed June 27, 1914. Serial No. 847,670.

*To all whom it may concern:*

Be it known that I, JOHN C. CALDWELL, a citizen of the United States, residing at Beaumont, in the county of Jefferson and State of Texas, have invented new and useful Improvements in Water-Crafts, of which the following is a specification.

This invention relates to water craft, the broad object of the invention being to produce a novel and attractive bathing float equipped with propelling means whereby it may be propelled from place to place, and also embodying a depressible platform combined with what may be termed a diving rudder, by means of which the forward part of the craft may be caused to dive beneath the surface of the water and under oncoming waves.

With the above and many other objects in view, the invention consists in the novel construction, combination and arrangement of parts, as herein described, illustrated and claimed.

In the accompanying drawings:—Figure 1 is a plan view of the water craft of this invention. Fig. 2 is a side elevation of the same showing the depressible frame in its normal elevated position. Fig. 3 is a similar view showing the depressible frame at the lower limit of its movement. Fig. 4 is a vertical cross section in line with the propeller shaft. Fig. 5 is a detail section taken longitudinally of the propeller shaft showing the reversing rack and pinion mechanism. Fig. 6 is a detail perspective view of the propeller. Fig. 7 is a detail section taken adjacent to and showing the propeller shaft spring. Fig. 8 is a detail vertical longitudinal section showing the propeller reversing lever in two positions. Fig. 9 is a detail view of one of the reverse motion yokes or transmission levers and connections. Fig. 10 is a detail vertical longitudinal section showing the frame locking and releasing mechanism. Fig. 11 is a cross section through the same. Fig. 12 is a fragmentary perspective view of the foot steering bar and pedal adjustment. Fig. 13 is a detail plan view of the diving rudder and connections. Fig. 14 is a detail vertical longitudinal section showing the frame lifting mechanism. Fig. 15 is a side diagrammatic elevation showing the articulated chair in its upright position, also showing the reclining and folded positions thereof in dotted lines. Fig. 16 is a similar view showing the chair partially and fully depressed. Fig. 17 is a detail elevation of the chair locking mechanism. Fig. 18 is a detail view of the cover latch and rack. Fig. 19 is an end elevation of the head rest and shaft detached. Fig. 20 is a detail section of the head rest height adjusting means. Fig. 21 is a detail section through one of the floats showing the compartmental construction thereof and also the air pump, air valve and sea cock.

The water craft contemplated in this invention comprises a pair of floats 1 which are preferably parallel to each other and located at any suitable distance apart, the same being connected in rigid relation to each other by a cross bar 2 near the forward ends of the floats, which forward ends are pointed similarly to a boat. Each of the floats 1 is hollow and comprises any desired number of bulk heads 4 dividing each float into a number of compartments one or more of which may be provided with a sea cock or valve 5 closing an opening 6 in the bottom thereof, an air valve 7 to allow for the escape of air and permit the entrance of water through the sea cock, an air pump 8 for forcing air into the float and expelling the water, and an air check valve 9 located between the pump and the interior of the float. By the construction just referred to, one or more of the compartments of both floats may be partially or wholly filled with water in accordance with the number and weight of the passengers and in order to obtain the best action and diving effect of the craft as will hereinafter appear.

B generally designates a frame which is supported between the floats 1, said frame comprising the parallel side bars 10 which are connected at several points by cross bars hereinafter referred to by reference numerals and which serve to form a rigid rectangular frame the same having a jointed or pivotal connection adjacent to its rear end at the point 11 with the corresponding ends of the floats 1, whereby the opposite or forward end of said frame B may be dropped or depressed for a purpose which will hereinafter appear.

12 designates a front platform which has a fixed relation to the side bars 10 and to a front cross bar 13. On this front cross bar 13 is a centrally pivoted foot steering bar 14 provided at opposite sides of the pivotal center 15 thereof with adjustable pedals 16 having shanks 17 which are slidable in guide ways 18 near the opposite ends of the foot bar, each of said shanks being adapted to be held fixed by means of a set screw 19, thus adapting the pedals to be adjusted to suit legs of different lengths. From the opposite ends of the foot bar, steering connections 20 such as wires, chains or ropes extend through suitable guide ways to the rear of the craft where they are terminally attached to the opposite ends of the cross head 21 of a rudder 22.

In addition to the front platform 12 there is a rear platform 23 which is supported at its forward end by a cross bar 24 and at its rear end by a cross bar 25, said bars 24 and 25 connecting the side bars 10 of the depressible frame. In rear of the rear cross bar 25 are rearwardly converging rudder supporting bars 26 in which the rudder post 27 is journaled, as shown. The propelling mechanism will now be described. 28 designates a horizontal oscillatory propeller shaft extending transversely of and supported by bearings 29 on the frame B. Extending downwardly from the propeller shaft 28 in perpendicular relation thereto is a propeller arm 30 having pivotally connected thereto on opposite sides, feathering paddles 31 which in the forward or return movement of the propeller arm are adapted to fold toward each other in substantially parallel relation and in the reverse or working stroke, are supported in a position perpendicular to the direction of the stroke by means of shoulders 32 on said paddles which come in contact with opposite sides of the propeller arm 30. The paddles thus automatically feather themselves in the return stroke of the propeller arm. The propeller is reversible for the purpose of propelling the machine either in a forward or backward direction by the following means. At its upper end the propeller arm 30 passes through the propeller shaft 28 and is journaled therein, said propeller shaft having its central portion enlarged and formed with a cavity 33 in which is a slidable rack bar 34 which meshes with a pinion 35 fast on the propeller arm, the rack bar being provided with stop shoulders 36 in spaced relation to each other so as to arrest the turning movement of the propeller arm when the blades are facing forwardly or rearwardly. The rack bar is held toward one end of its movement by means of a coiled expansion spring 37 and is moved to its limit in the opposite direction by means of a flexible connection 38 which passes around a sheave 39 and forward to a link 40 on a propeller reversing lever 41 fulcrumed at 42 on the frame B, the relation of the cord and the link 40 and the lever 41 being such in relation to the pivot point 42 that when the lever 41 lies horizontally and points in a rearward direction, the propeller arm 30 will be set, for example, in position to propel the machine in a forward direction and when said lever 41 is turned through an arc of approximately 180 degrees, the propeller will be set to propel the craft in the opposite direction, the tension of the cord on the link 40 serving to sustain the lever 41 in either of its two useful positions.

The means for oscillating the propeller shaft 28 consists, in the preferred embodiment of the invention, of two hand levers 43 arranged in convenient relation to the operator's chair designated generally at C. Each lever is pivotally connected at its lower end at 44 to the frame B and has pivotally attached thereto at the point 45 a rearwardly extending rod 46 the rear end of which is attached pivotally to a centrally pivoted yoke or transmission lever 47 on the frame B. The lever or yoke 47 is provided at the extremities of its arms with studs 48 either one of which is adapted to fit an eye in the rear end of the rod 46 which enables said rod to be adjusted to either arm of said lever where it is held in engagement with the adjacent stud 48 by means of a latch or detent 49. Another rod 50 extends from the transmission lever or yoke 47 rearwardly and is pivotally connected at 50 to an operating arm 51 adjacent to one end of the propeller shaft 28. It will be understood that two sets of connections of the character just described are employed to connect the two hand levers 43 with the propeller shaft 28 and it will now be seen that by shifting the point of connection between one of the rods 46 and said transmission lever or yoke, the hand levers 43 may be arranged to operate simultaneously in the same or opposite directions as may be found desirable by the operator. The propeller shaft 28 is also provided with other arms 52 extending downwardly therefrom and carrying pins 53 which engage the divergent arms 54 of springs 55 which serve to assist in the back and forth movements of the propeller arm 30. The propeller operates under the rear platform 23 and said platform is provided with a slot 56 of suitable size and shape to permit the propeller arm and propeller paddles to be swung upwardly through the platform for examination and repair purposes by disengaging the rods 50 from the operating arms on the propeller shaft.

The frame B is held in its normal elevated position by means of a sliding locking bolt 57 mounted in a suitable guide 58 on the frame B, the extremity of said bolt being beveled and adapted to snap into engagement with a keeper 59 on the front cross bar 2 above referred to. The bolt is actuated to its locking position by a thrust spring 60 and is provided adjacent to its rear end with a shoulder 61 which is adapted to be engaged by a thumb latch 62 carried by one of the hand levers 43 and operated by means of a button 63 in the upper extremity of the hand lever as shown. When the lever 43 is thrown to its extreme forward position and the latch 62 depressed, it engages the shoulder 61 and then when said lever 43 is drawn backwardly, the bolt 57 is moved in a corresponding direction thus unlocking the frame B and allowing the same to move downwardly, the downward movement of the frame being limited by L-shaped stay levers 64 pivotally attached at 65 to the side bars of the frame B. The longer arms of said levers are slotted at 66 to engage headed studs 67 on the inner sides of the floats A. The shorter arm of each of said levers is provided in the extremity thereof with a notch 68 and when it is desired to elevate the frame B, the levers 43 both of which are equipped with thumb latches 62 are thrown to the forward limit of their movement and the latches engaged with the notches 68. Then by drawing the levers in a rearward direction, the said levers 64 are rocked on their pivotal connection thus causing the frame B to be drawn upward until the locking bolt 57 snaps into engagement with the keeper 59. The frame is now again locked in its elevated position to the floating structure.

69 designates a horizontal or diving rudder which is normally inclined upwardly toward its forward edge, the rear edge of said rudder being fixedly connected to a horizontal rudder post or rock shaft 70 which is journaled at its opposite ends in the side bars of the frame B. The shaft 70 is provided at one end with an operating arm 71 to which is attached the forward extremity of a thrust rod 72 normally pressed rearwardly by a coiled expansion spring 73 which operates against a shoulder 74 on said thrust rod. At the rear end of said thrust rod is a pedal 75 by means of which the operator may depress the horizontal rudder 69 to give a downward inclination thereto and assist in the diving action of the bathing float or water craft. Extending rearwardly from the pedal is another thrust rod 76 which passes through suitable guides 77 and is pivotally connected at its rear end to a small hand lever 78 which may be used by the operator to manipulate the rudder 69. The rudder may thus be operated either by foot or by hand.

The chair C comprises a seat 79, front legs 80 which are pivotally connected to the seat frame at their upper extremities and have their lower extremities mounted on a transverse shaft 81 on the platform 12. The chair also comprises the rear uprights 82 which are pivotally connected at their lower extremities at 83 to the frame B and pivotally connected at 84 to the seat frame, said uprights extending above the seat and being connected by a top cross bar 85 to form a chair back. The chair thus articulated is adapted to be adjusted to an upright position or to a reclining position or to any of the other positions illustrated in Figs. 15 and 16.

The means for holding the chair in any of its adjusted positions is illustrated in Fig. 17 in which it will be observed that brace rods 86 are pivotally connected at 87 to the rear uprights 82, said brace rods extending forwardly and being provided on their lower sides with rack teeth 88. Each rod 86 engages a locking pinion 89 journaled on the frame B and in turn engaged by a locking tooth or detent 90 on a spring arm 91. Extending upwardly from the arm arm 91 is the shank 92 of a depressible button 93 arranged adjacent to the chair C. The arrangement referred to is duplicated at each side of the chair and by depressing both of the buttons 93 the detents are disengaged from the pinions allowing the chair to be adjusted to any of its several positions whereupon the buttons 93 are released thereby relocking the chair in its new position.

94 designates a cylindrical head rest which is eccentrically mounted on a shaft 95 provided at its opposite extremities with shoes or runners 96 slidable up and down in guides 97 on the uprights 82. The shaft 95 is provided adjacent to the runners 96 with teeth 98 for sustaining the head rest at any desired elevation to suit the operator and is also provided with ratchet wheels 99 adapted to be engaged by spring pressed pawls 100 to hold the head rest 94 from rotating after it has been adjusted to suit the operator.

D designates generally a top or canopy connected to the chair back to protect the operator from the elements, said cover embodying a frame consisting of a plurality of bows 101 one of which is pivotally connected to the other at 102 and further connected therewith by jointed braces 103 to limit the opening movement of the bows. One of the bows is connected to the chair back by means of pins or bolts 104 passing through bearing sleeves 105 on the chair back, each of said sleeves being provided with a disk shaped rack 106 adapted to be engaged by a spring pressed latch 107 on the adjacent bow, said latch being provided with a button or thumb piece 108. By simultaneously pressing on said latches, the bows are unlocked in relation to each other thereby enabling the cover or canopy to be folded, the bows being held either in their open or closed positions by means of said latches.

The water craft hereinabove described may of course be built to accommodate any number of passengers and operators sitting in tandem. Only a small surface is presented to the action of the wind enabling the craft to be rapidly propelled against a head wind, the device thereby forming an efficient life saving craft. All of the mechanism is mounted on the depressible platform and the chair is adjustable to various inclinations to suit the operator. The craft is practically non-capsizable and non-sinkable and the floats being air-tight, the craft will immediately come to the surface after the diving operation enforced by the horizontal diving rudder at the forward end of the craft. By means of the mechanism described in connection with the propeller shaft, the propeller arm and paddles may be reversed so as to propel the craft in either direction. The craft while adapted for use as a life saving boat, is particularly designed as a bathing float and amusement device. In the diving operation, the machine is propelled rapidly by the propelling mechanism and then the depressible platform is quickly unlocked and the diving rudder thrown to the proper angle to cause the depressible frame to move quickly downward and draw the forward end of the craft in a corresponding direction; subsequently the depressible frame is restored to its elevated position by the propeller operating levers.

What I claim is:—

1. A water craft comprising a pair of connected catamaran floats, a platform interposed between said floats and having a jointed connection therewith adjacent to one end, whereby the opposite end of said platform may be lowered relatively to said floats, and a horizontal rudder on the movable end of said platform.

2. A water craft comprising a pair of connected catamaran floats, a frame interposed between said floats and having a jointed connection adjacent to its rear end therewith, a platform and propelling and steering mechanism on said frame, means for locking and releasing the other end of said frame, and means for limiting the downward movement of said frame.

3. A water craft comprising a pair of connected catamaran floats, a frame interposed between said floats and having a jointed connection adjacent to one end therewith, a platform on said frame, an articulated chair, and means for locking said chair at varying angles.

4. A water craft comprising a pair of connected catamaran floats, a frame interposed between said floats and having a jointed connection adjacent to one end therewith, a platform on said frame, an articulated chair embodying a back and adapted to be moved from an upright to a reclining or substantially horizontal position, and means for locking said chair at any angle of reclination.

5. A water craft comprising a pair of connected catamaran floats, a frame interposed between said floats and having a jointed connection adjacent to one end therewith, a platform on said frame, an articulated chair, means for locking said chair at varying angles, and an adjustable head rest on the chair frame.

6. A water craft comprising a pair of connected catamaran floats, a platform interposed between said floats and having a jointed connection therewith whereby said platform may be lowered and elevated relatively to said floats, and propelling means including a propeller and an operating hand lever therefor, said hand lever being adapted to actuate the platform locking and unlocking means.

In testimony whereof I affix my signature in presence of two witnesses.

JOHN C. CALDWELL.

Witnesses:
A. D. LIPSCOMB,
SAMUEL C. LIPSCOMB.

Copies of this patent may be obtained for five cents each, by addressing the "Commissioner of Patents, Washington, D. C."